US008909926B2

(12) United States Patent
Brandt et al.

(10) Patent No.: US 8,909,926 B2
(45) Date of Patent: Dec. 9, 2014

(54) SYSTEM AND METHODOLOGY PROVIDING AUTOMATION SECURITY ANALYSIS, VALIDATION, AND LEARNING IN AN INDUSTRIAL CONTROLLER ENVIRONMENT

(75) Inventors: David D. Brandt, Milwaukee, WI (US); Kenwood Hall, Hudson, OH (US); Mark Burton Anderson, Chapel Hill, NC (US); Craig D. Anderson, Chapel Hill, NC (US); George Bradford Collins, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2277 days.

(21) Appl. No.: 10/661,696

(22) Filed: Sep. 12, 2003

(65) Prior Publication Data
US 2004/0117624 A1 Jun. 17, 2004

Related U.S. Application Data

(60) Provisional application No. 60/420,006, filed on Oct. 21, 2002.

(51) Int. Cl.
*H04L 29/06* (2006.01)
*H04L 29/08* (2006.01)
(52) U.S. Cl.
CPC .......... *H04L 63/1408* (2013.01); *H04L 69/329* (2013.01); *H04L 67/12* (2013.01)
USPC ........... 713/166; 713/171; 709/205; 709/219; 709/224
(58) Field of Classification Search
USPC ....................................................... 713/166
See application file for complete search history.

(56) References Cited

U.S. PATENT DOCUMENTS

| 4,200,770 A | 4/1980 | Hellman et al. |
| 4,882,752 A | 11/1989 | Lindman et al. |

(Continued)

FOREIGN PATENT DOCUMENTS

| GB | 2 368 701 A | 5/2002 |
| WO | 0126335 A2 | 4/2001 |

OTHER PUBLICATIONS

Gervais, A., 'Security Analysis of Industrial Control Systems', Aalto University-KTH Stockholm, Jun. 29, 2012, entire document, http://nordsecmob.aalto.fi/en/publications/theses_2012/gervais-arthur_thesis.pdf.*

(Continued)

*Primary Examiner* — Kambiz Zand
*Assistant Examiner* — Ronald Baum
(74) *Attorney, Agent, or Firm* — Amin, Turocy & Watson, LLP

(57) ABSTRACT

The present invention relates to a system and methodology facilitating automation security in a networked-based industrial controller environment. Various components, systems and methodologies are provided to facilitate varying levels of automation security in accordance with security analysis tools, security validation tools and/or security learning systems. The security analysis tool receives abstract factory models or descriptions for input and generates an output that can include security guidelines, components, topologies, procedures, rules, policies, and the like for deployment in an automation security network. The validation tools are operative in the automation security network, wherein the tools perform security checking and/or auditing functions, for example, to determine if security components are in place and/or in suitable working order. The security learning system monitors/learns network traffic patterns during a learning phase, fires alarms or events based upon detected deviations from the learned patterns, and/or causes other automated actions to occur.

30 Claims, 12 Drawing Sheets

(56) References Cited

U.S. PATENT DOCUMENTS

| | | | |
|---|---|---|---|
| 5,051,837 A | 9/1991 | McJunkin | |
| 5,202,997 A | 4/1993 | Arato | |
| 5,371,794 A | 12/1994 | Diffie et al. | |
| 5,535,276 A | 7/1996 | Ganesan | |
| 5,539,906 A | 7/1996 | Abraham et al. | |
| 5,604,914 A | 2/1997 | Kabe | |
| 5,917,840 A | 6/1999 | Cheney et al. | |
| 5,923,756 A | 7/1999 | Shambroom | |
| 6,088,679 A | 7/2000 | Barkley | |
| 6,088,804 A * | 7/2000 | Hill et al. | 726/25 |
| 6,108,785 A | 8/2000 | Poisner | |
| 6,298,445 B1 | 10/2001 | Shostack et al. | |
| 6,374,358 B1 * | 4/2002 | Townsend | 726/1 |
| 6,418,533 B2 | 7/2002 | Angelo et al. | |
| 6,421,571 B1 | 7/2002 | Spriggs et al. | |
| 6,542,993 B1 * | 4/2003 | Erfani | 726/1 |
| 6,571,141 B1 | 5/2003 | Brown | |
| 6,615,258 B1 | 9/2003 | Barry et al. | |
| 6,735,601 B1 | 5/2004 | Subrahmanyam | |
| 6,760,782 B1 | 7/2004 | Swales | |
| 6,842,860 B1 | 1/2005 | Branstad et al. | |
| 6,920,558 B2 | 7/2005 | Sames et al. | |
| 6,944,761 B2 | 9/2005 | Wood et al. | |
| 6,957,348 B1 | 10/2005 | Flowers et al. | |
| 6,961,584 B2 | 11/2005 | Leedom, Jr. | |
| 6,981,142 B1 * | 12/2005 | Gulcu | 713/165 |
| 7,010,590 B1 | 3/2006 | Munshi | |
| 7,013,395 B1 * | 3/2006 | Swiler et al. | 726/25 |
| 7,020,701 B1 | 3/2006 | Gelvin et al. | |
| 7,035,898 B1 | 4/2006 | Baker | |
| 7,047,423 B1 * | 5/2006 | Maloney et al. | 726/2 |
| 7,058,154 B1 | 6/2006 | Stark et al. | |
| 7,089,303 B2 * | 8/2006 | Sheymov et al. | 709/224 |
| 7,093,121 B2 | 8/2006 | Barton et al. | |
| 7,100,196 B2 | 8/2006 | Fredriksson | |
| 7,127,526 B1 | 10/2006 | Duncan et al. | |
| 7,139,843 B1 | 11/2006 | Brown et al. | |
| 7,162,534 B2 | 1/2007 | Schleiss et al. | |
| 7,193,993 B2 | 3/2007 | Silvester | |
| 7,254,601 B2 | 8/2007 | Baller et al. | |
| 7,349,987 B2 | 3/2008 | Redlich et al. | |
| 7,370,350 B1 | 5/2008 | Salowey | |
| 7,716,489 B1 | 5/2010 | Brandt et al. | |
| 7,761,460 B1 | 7/2010 | Hall | |
| 7,950,044 B2 | 5/2011 | Brandt et al. | |
| 7,990,967 B2 | 8/2011 | Brandt et al. | |
| 8,429,393 B1 | 4/2013 | Anderson et al. | |
| 8,732,658 B2 | 5/2014 | Plache et al. | |
| 8,774,186 B2 | 7/2014 | Brandt et al. | |
| 8,776,092 B2 | 7/2014 | Plache et al. | |
| 2001/0013098 A1 | 8/2001 | Angelo et al. | |
| 2002/0006790 A1 | 1/2002 | Blumenstock et al. | |
| 2002/0023231 A1 | 2/2002 | Pathuel | |
| 2002/0078153 A1 | 6/2002 | Chung et al. | |
| 2002/0099959 A1 | 7/2002 | Redlich et al. | |
| 2002/0112152 A1 | 8/2002 | VanHeyningen et al. | |
| 2002/0147820 A1 | 10/2002 | Yokote | |
| 2002/0152289 A1 | 10/2002 | Dube | |
| 2002/0161905 A1 | 10/2002 | Haverinen et al. | |
| 2002/0163920 A1 | 11/2002 | Walker et al. | |
| 2002/0188870 A1 | 12/2002 | Gong et al. | |
| 2002/0199122 A1 | 12/2002 | Davis et al. | |
| 2003/0014500 A1 | 1/2003 | Schleiss et al. | |
| 2003/0033516 A1 * | 2/2003 | Howard et al. | 713/152 |
| 2003/0093521 A1 | 5/2003 | Schlonski et al. | |
| 2003/0105535 A1 | 6/2003 | Rammler | |
| 2003/0126472 A1 | 7/2003 | Banshof | |
| 2003/0140094 A1 | 7/2003 | Collier et al. | |
| 2003/0200437 A1 | 10/2003 | Oishi | |
| 2003/0221124 A1 | 11/2003 | Curran et al. | |
| 2003/0229812 A1 | 12/2003 | Buchholz | |
| 2003/0233573 A1 | 12/2003 | Phinney | |
| 2004/0015619 A1 | 1/2004 | Brown et al. | |
| 2004/0019808 A1 | 1/2004 | Devine et al. | |
| 2004/0027875 A1 | 2/2004 | Dinges et al. | |
| 2004/0034774 A1 | 2/2004 | Le Saint | |
| 2004/0049674 A1 | 3/2004 | Collier et al. | |
| 2004/0059920 A1 * | 3/2004 | Godwin | 713/183 |
| 2004/0073800 A1 | 4/2004 | Shah et al. | |
| 2004/0075590 A1 | 4/2004 | Pearson et al. | |
| 2004/0107345 A1 | 6/2004 | Brandt et al. | |
| 2004/0125146 A1 | 7/2004 | Gerlach et al. | |
| 2004/0139353 A1 | 7/2004 | Forcade | |
| 2004/0153172 A1 | 8/2004 | Rousseau et al. | |
| 2004/0260954 A1 | 12/2004 | Morse | |
| 2005/0021839 A1 | 1/2005 | Russell et al. | |
| 2005/0091492 A1 | 4/2005 | Benson et al. | |
| 2005/0228998 A1 | 10/2005 | Chan et al. | |
| 2005/0235148 A1 | 10/2005 | Scheidt et al. | |
| 2006/0095771 A1 | 5/2006 | Appenzeller et al. | |
| 2006/0206932 A1 | 9/2006 | Chong | |
| 2008/0016569 A1 | 1/2008 | Hammer et al. | |

OTHER PUBLICATIONS

Sang-Ho Lee, Suk Lee, Joon-Woo Son, Man Hyung Lee, Janmyung Lee, Jong Il Bae, Jong-Nyun Lee, "Neuro-Fuzzy Performan Management of Factory Automation Networks", 1997, 5 pages.

F. Olaechea; Partial European Search Report; EP 03 02 3916; The Hague, Nov. 16, 2004.

Insight Consulting; Insight on CRAMM IV; Insight Consulting Online; Nov. 30, 2001; http://www.infosec-associates.com/framework/downloads/insight_cramm.pdf.

Interkama; DuPont Shares Network Security Methodology; Interkama Online, Mar. 15, 2002; http://www3.interkama.com/cipp/interkama/custom/pub/content,lang,2/ticket,g_u_e_s_t/oid,3781.

Rockwell Automation; Rockwell Automation and DuPont Engineering sign worldwide licensing agreement to standardize and improve industrial computer networking security; Online, Mar. 7, 2002; http://domino.automation.rockwell.com/applications/gs/region/gtwwebst.nsf/pages/Rockwell_Automation_and_DuPont_Engineering_Sign_....

D. Spinellis, S. Kokolakis and S. Gritzalis; Security Requirements, risks and recommendations for small enterprise and home-office environments; Information Management & Computer Security; Online, vol. 7, No. 3, Dec. 31, 1999; http://www.dmst.aueb.gr/dds/pubs/jml/1999-1MCS-Soft-Risk/html/soho.pdf.

Wilmington Section ISA; Wilmington ISA Section Plant Tour of Astropower; ISA Online, Mar. 21, 2001; http://www.isa.org/{wilmdel/Sensor/Mar01.pdf.

D. Harrold; Control Engineering; Online, Mar. 1, 2003; http://www.manufacturing.net/ctl.article/CA283196.

L. Falkenau; Site networking and beyond; ISA, Online, Jul. 1, 2003; http://www.isa.org/InTechTemplate.cfm?Section=Departments4&template=/ContentManagement/ContentDisplay.cfm&ContentID=28025.

European Search Report dated Oct. 7, 2005 mailed Nov. 3, 2005 for European Patent Application Serial No. 03023916.4-2413 PCT, 3 pages.

H.S. Teng et al., Adaptive Real-Time Anomaly Detection Using Inductively Generated Sequential Patterns, Proceedings of Symposium on Research in Security and Privacy, Oakland, May 7-9, 1990, pp. 278-284, Los Alamitos, IEEE Comp. Soc. Press, US.

H. Debar et al., A Neural Network Component for an Intrusion Detection System, Proceedings of the Computer Society on Research in Security and Privacy, Oakland, May 4-6, 1992, pp. 240-250, 1992, Los Alamitos, IEEE Comp. Soc. Press, US.

European Search Report dated Oct. 31, 2005 mailed Nov. 15, 2005 for European Patent Application Serial No. 03023911.4-2413, 3 Pages.

P. Oman et al., Concerns About Intrusions Into Remotely Accessible Substation Controllers and Scada Systems, 2000, 16 pages, retrived from the Internet: URL: http://citeseer.ist.psu.edu/cache/papers/cs/26811/http:zSzzSzwww.csds.uidaho.eduzSzdirectorzSzSC_ADA.pdf/oman00concerns.pdf.

Verano, Defender Watches Over Industrial Control Networks, Aug. 10, 2003, 2 pages, retrieved from the Internet: URL: http://web.archive.org/web/20030810201511/http://www.engineeringtalk.com/news/vra/vra102.html.

(56) References Cited

OTHER PUBLICATIONS

N. Jones, et al. "Introducing EtherNET/IP". 6th ODVA annual meeting Mar. 8, 2000. Retrieved from the Internet: URL: http://www.odva.org/10_2/03_events /NewEtherNet/EtherNet-IPOverview.ppt retrieved on Nov. 11, 2004. 25 pages.

T. Cutler. "Wireless Ethernet and How to Use It". The Online Industrial Ethernet Book. Oct. 10, 2002. Retrieved from the internet: URL: http//web.archive.org/web/20021020173452/http://ethernet.industrial-networking.com/articles/i05wirelessethernet.asp retrieved on Nov. 18, 2004. 3 pages.

A.C. Weaver. Institute of Electrical and Electronics Engineers: "Factory Monitoring and Control Using the Internet". Proceedings of the 27th Annual Conference of the IEEE Industrial Electronics Society. Denver, CO, Nov. 29-Dec. 2, 2001, Annual Conference of the IEEE Industrial Electronics Society, New York, NY: IEEE, US, vol. 1 of 3 Conf. Nov. 27 and 29, 2001 pp. 1639-1645. 32 pages.

J. Rinaldi. "Introduction to Ethernet/IP". The Online Industrial Ethernet Book. Sep. 30, 2002. Retrieved from the internet: URL: http://ethernet.industrial-networking.com/articles/illethernet.asp retrieved on Nov. 18, 2004. 2 pages.

Bridges, S., Vaughn, R. and Siraj, A. "AI Techniques Applied to High Performance Computing Intrusion Detection" Proceeding of the Tenth International Conference on Telecommunication Systems, Modeling and Analysis, Monterey CA, vol. 2, pp. 100-114, Oct. 3-6, 2002.

F. Olaechea. Partial European Search Report. Feb. 18, 2005. 5 pages. The Hague.

EPB OA Dated Jul. 8, 2008 for European Patent Application No. 03 023 911.5, 7 pages.

Rockwell Automation: "Plant Floor Security. Proposed Agenda for Sector Workshop", May 6, 2002. Retrieved from the internet on Jun. 17, 2007. http://www.isd.mel.nist.gov/projects/processcontrol/members/documents/RA-Workshop-Agenda.pdf, 52 pages.

EPC OA dated Jun. 30, 2008 for European Patent Application No. 03 023 916.4, 6 pages.

OA Dated Oct. 22, 2008 for U.S. Appl. No. 10661239, 19 pages.

Final OA mailed Oct. 1, 2008 for U.S. Appl. No. 10/661,690, 31 pages.

EPB OA dated Jul. 4, 2007 for European Patent Application No. 03 023 911.5, 7 pages.

EPC OA dated Jul. 4, 2007 for European Patent Application No. 03 023 916.4, 5 pages.

OA dated Apr. 27, 2009 for U.S. Appl. No. 10/661,239, 25 pages.

OA dated Jun. 10, 2009 for U.S. Appl. No. 10/661,690, 24 pages.

European Search Report dated Dec. 5, 2007, mailed Jan. 4, 2008 for Application EP07117185, 6 pages.

Wong, et al. "Mutual Authentication and Key Exchange for Low Power Wireless Communications" Proceedings of MILCOM 2001, IEEE, pp. 39-43.

Ng, et al. "Comments on Mutual Authentication and Key Exchange Protocols for Low Power Wireless Communications" Apr. 2004 IEEE Communication Letters vol. 8 No. 4 pp. 262-263.

Berrendonner, et al. "MAKE: Mutual Authentication with Key Exchange" Oct. 31, 2001 Internet Engineering Task Force, pp. 6-7.

OA dated Dec. 16, 2009 for U.S. Appl. No. 11/535,773, 38 pages.

EP OA dated Sep. 11, 2008 for EP Application No. 07117185.4-2413, 6 pages.

OA dated May 11, 2010 for U.S. Appl. No. 11535773, 45 pages.

Lai, et al. "Scalable Session Key Construction Protocol for Wireless Sensor Networks" 2002, IEEE Workshop on Large Scale RealTime and Embedded Systems (LARTES), 6 pages.

OA dated Jan. 21, 2011 for U.S. Appl. No. 11/535,773,55 pages.

Huang, et al. Fast Authenticated Key Establishment Protocols for Self—Organizing Sensor Networks. In Proceedinds of the 2nd ACM International Conference on Wireless Sensor Networks and Applications (WSNA'03), NY, USA, pp. 141-150.

OA dated Jul. 21, 2011 for U.S. Appl. No. 11/535,773, 42 pages.

Dichtl, et al., "A High Quality Physical Random No. Generator", Proc. Sophia Forums Microelectronics (SAME 2000), pp. 48-53, 2000. Last accessed Jul. 21, 2011, 9 pages.

Office Action for U.S. Appl. No. 13/593,037, dated Jul. 16, 2014, 39 pages.

\* cited by examiner

SYSTEM AND METHODOLOGY PROVIDING AUTOMATION SECURITY ANALYSIS, VALIDATION, AND LEARNING IN AN INDUSTRIAL CONTROLLER ENVIRONMENT

REFERENCE TO RELATED APPLICATION(S)

This application claims the benefit of U.S. Provisional Patent Application Serial No. 60/420,006 which was filed Oct. 21, 2002, entitled System and Methodology Providing Automation Security in an Industrial Controller Environment, the entirety of which is incorporated herein by reference.

TECHNICAL FIELD

The present invention relates generally to industrial control systems, and more particularly to a system and methodology to facilitate electronic and network security in an industrial automation system.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/ or other data types to name but a few examples.

Various remote applications or systems often attempt to update and/or acquire PLC information or related device information via a plurality of different, competing and often incompatible or insecure network technologies. A major concern with this type of access to PLCs and control systems in general, relates to the amount of security that is provided when sending or receiving data to and from the PLC and/or associated equipment. In most factories or industrial environments, complex and sometimes dangerous operations are performed in a given manufacturing setting. Thus, if a network-connected controller were inadvertently accessed, or even worse, intentional sabotage were to occur by a rogue machine or individual, potentially harmful results can occur.

One attempt at providing security in industrial control systems relates to simple password protection to limit access to the systems. This can take the form of a plant or controls Engineer or Administrator entering an alpha-numeric string that is typed by an operator each time access is attempted, wherein the controller grants access based on a successful typing of the password. These type passwords are highly prone to attack or discovery, however. Often times, users employ passwords that are relatively easy to determine (e.g., person's name or birthday). Sometimes, users exchange passwords with other users, whereby the password is overheard or simply, a user with improper authorization comes in contact with the password. Even if a somewhat higher level of security is provided, parties employing sophisticated hacking techniques can often penetrate sensitive control systems, whereby access should be limited to authorized users and/or systems in order to mitigate potentially harmful consequences.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate network and/or automation device security in an industrial automation environment. Various systems and methodologies are provided to promote security across and/ or within networks and in accordance with different automation device capabilities. In one aspect of the present invention, a Security Analysis Methodology (SAM) and tool provides an automated process, component, and tool that generates a set (or subset) of security guidelines, security data, and/or security components. An input to the tool can be in the form of an abstract description or model of a factory, wherein the factory description includes one or more assets to be protected and associated pathways to access the assets. Security data generated by the tool includes a set of recommended security components, related interconnection topology, connection configurations, application procedures, security policies, rules, user procedures, and/or user practices, for example.

SAM can be modeled on a risk-based/cost-based approach, if desired. A suitable level of protection can be determined to facilitate integrity, privacy, and/or availability of assets based on risk and/or cost. In addition, descriptions of shop floor access, Intranet access, Internet access, and/or wireless access can also be processed by the tool. Since multiparty involvement can be accommodated (IT, Manufacturing, Engineering, etc.), the tool can be adapted for partitioned security specification entry and sign-off. The security data of the SAM tool can be generated in a structured security data format (e.g., XML, SQL) that facilitates further validation and compliance checking of the security data, if desired.

In another aspect of the present invention, a security Validation Methodology and associated tools can be provided. The validation tools perform initial and periodic live security assessment of a physical system. This enables security flaws or weaknesses to be identified. One aspect of the tools is to check a system prior to security modifications in order to assess current security levels. Another aspect is to check a system for conformance—either to recommendations of a security analysis, and/or against standards such as ISO, for example. The validation tools can be executed on end devices (host based), and/or executed as an independent device that is operatively coupled to a network (network based) at selected points. One function of host-validation tools is to perform vulnerability scanning and/or auditing on devices. This includes revision checks, improper configuration check, file system/registry/database permissions check, user privilege/password and/or account policy checks, for example.

One function of the network validation tools is to perform vulnerability scanning and auditing on the networks. This includes checking for susceptibility to common network-based attacks, searching for open TCP/UDP ports, and scanning for vulnerable network services. The tools can also attempt to gain key identity information about end devices that may enable hacker entry. Another function of the network validation tools is to perform vulnerability scanning and auditing on firewalls, routers, and/or other network/security devices. In addition, a complementary tool can be provided to assess CIP-based factory automation systems for security. This will typically be a network-based tool, since factory automation devices often are not as capable as general purpose computing devices. The tool can also be operable in an assessment mode to discover system flaws with little or no configuration, and the tool can operate in a validation mode to check system security against security analysis methodology determinations described above. Still other functions can include non-destructively mapping a topology of IT and automation devices, checking revisions and configurations, checking user attributes, and/or checking access control lists. The validation tools described herein can also be adapted to automatically correct security problems (e.g., automatically adjust security parameters/rules/policies, install new security components, remove suspicious components, and so forth).

According to another aspect of the present invention, a Security Learning system is provided that can include network-based aspects and/or host-based aspects and similar to some of the security aspects described above with respect to the Validation tools. A network-based security learning system (also referred to as learning component) is provided that monitors an automation network during a predetermined training period (e.g., monitor network activities for 1 week). During the training period, the learning component monitors and learns activities or patterns such as: the number of network requests to and from one or more assets; the type of requests (e.g., read/write, role/identity of person/system requesting access, time of requests); status or counter data (e.g., network access counters, error codes) which can be provided or queried from a learning or status component within the asset; and/or monitor and learn about substantially any data type or pattern that may be retrieved from the network and/or the asset.

After the training period, the learning component monitors the automation network and/or assets for detected deviations from data patterns learned during the training period. If desired, a user interface can be provided, wherein one or more pattern thresholds can be adjusted (also can provide options for the type of data patterns to monitor/learn). For example, if the number of network requests to the asset has been monitored and learned to be about 1000 requests per hour during the past month, then a threshold can be set via the user interface that triggers an alarm or causes an automated event to occur if a deviation is detected outside of the threshold (e.g., automatically disable all network requests from the other networks if the number of network requests to the asset exceeds 10% of the average daily network requests detected during the training period).

Various learning functions and/or processes can be provided to facilitate automated learning within the learning components. This can include mathematical processes, statistical processes, functions, and/or algorithms and include more elaborate systems such as a neural network, for example. In addition, artificial intelligence functions, components and/or processes can be provided. Such components can include automated classifiers for monitoring and learning data patterns, wherein such classifiers include inference models, Hidden Markov Models (HMM), Bayesian models, Support Vector Machines (SVM), vector-based models, decision trees, and the like.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating automation security in a networked-based industrial controller environment. Various components, systems and methodologies are provided to facilitate varying levels of automation security in accordance with security analysis tools, security validation tools and/or security learning systems. The security analysis tool receives abstract factory models or descriptions for input and generates an output that can include security guidelines, components, topologies, procedures, rules, policies, and the like for deployment in an automation security network. The validation tools are operative in the automation security network, wherein the tools perform security checking and/or auditing functions, for example, to determine if security components are in place and/or in suitable working order. The security learning system monitors/learns network traffic patterns during a learning phase, fires alarms or events based upon detected deviations from the learned patterns, and/or causes other automated actions to occur.

It is noted that as used in this application, terms such as "component," "tool," "analyzer," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
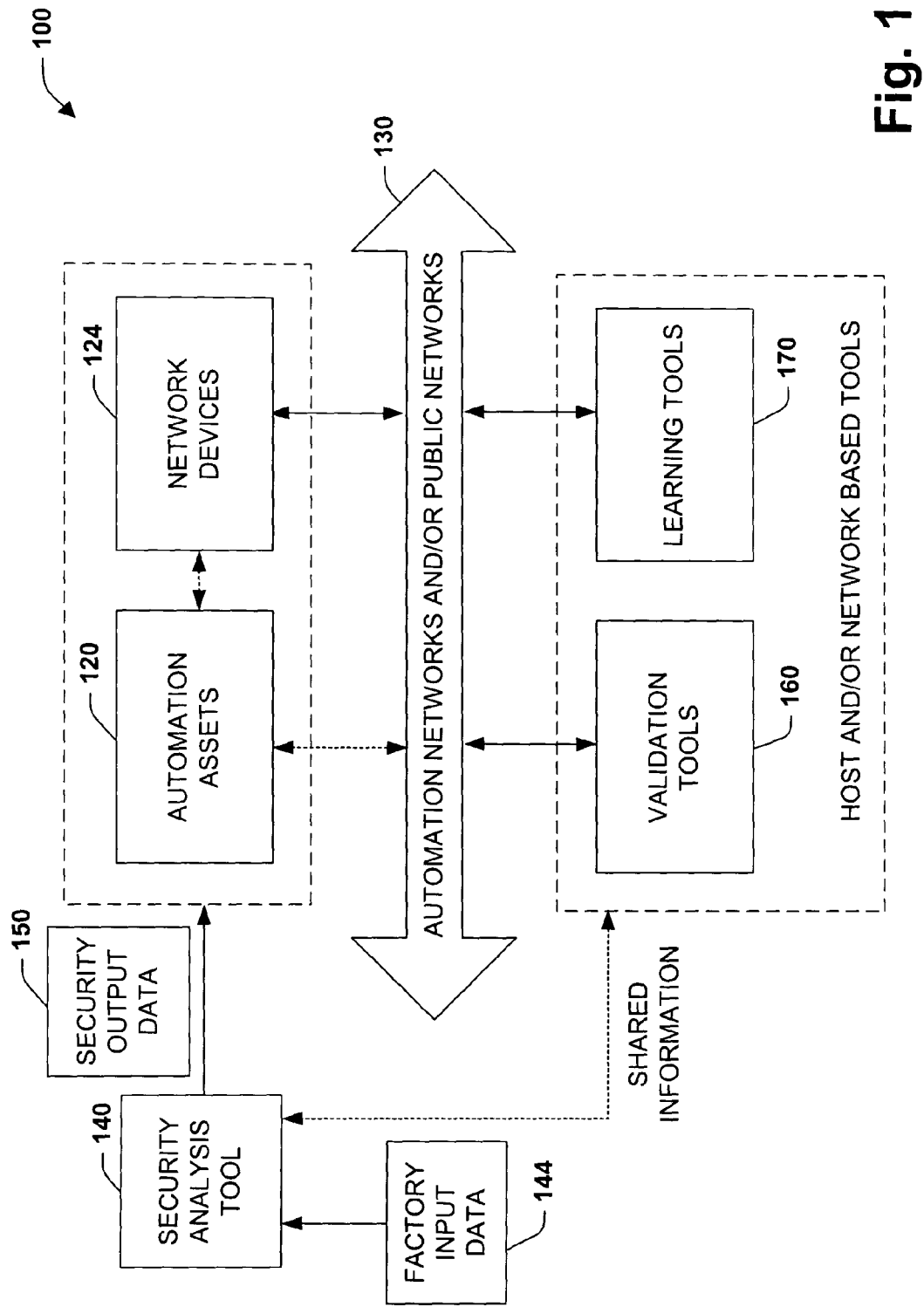
FIG. 1 is a schematic block diagram illustrating automation security tools in accordance with an aspect of the present invention.

Referring initially to FIG. 1, a system 100 illustrates various automation security tools in accordance with an aspect of the present invention. One or more automation assets 120 communicate and cooperate with various network devices 124 across a network 130. The automation assets 120 include substantially any type of control, communications module, computer, I/O device, Human Machine Interface (HMI) that communicate via the network 130 which includes control, automation, and/or public networks. In one example, the automation assets 120 include Programmable Logic Controllers (PLCs) that can also communicate to and control various other assets such as Input/Output modules including Analog, Digital, Programmed/Intelligent I/O modules, other programmable controllers, communications modules, and the like. The network 130 includes public networks such as the Internet, Intranets, and automation networks such as Control and Information Protocol (CIP) networks including DeviceNet and ControlNet. Other networks 130 include Ethernet, DH/DH+, Remote I/O, Fieldbus, Modbus, Profibus, wireless networks, serial protocols, and so forth. In addition to the automation assets 120, the network devices 124 include various possibilities (hardware and/or software components). These include components such as switches with virtual local area network (VLAN) capability, LANs, WANs, proxies, gateways, routers, firewalls, virtual private network (VPN) devices, intrusion detection systems, servers, clients, computers, configuration tools, monitoring tools, and/or other devices.

According to one aspect of the present invention, various security tools can be provided with the system 100. Although three tools are illustrated, it is to be appreciated that more or less than three tools can be employed with the present invention and in a plurality of similar or different combinations. In one aspect, a security analysis tool 140 is provided that receives factory input data 144 describing or modeling various aspects of the automation assets 120, network devices 124, network 130, and/or system 100. The security analysis tool 140 processes the factory input data 144 and generates security output data 150 which is then deployed to machines and/or users in order to facilitate suitable network security measures and practices in the system 100. As will be described in more detail below, such measures can include security recommendations, configuration guidelines or adjustments, procedures, rules, policies, and security parameters, for example, that are utilized to mitigate unwanted intrusions or attacks from the network 130 that may affect the automation assets 120 and/or network devices 124.

In another aspect of the present invention, one or more validation tools 160 can be provided (can be host and/or networked based) that perform automated security auditing and checking functions on the network 130, the automation assets 120, and/or network devices 124 to determine if suitable security standards have been implemented. The validation tools also perform periodic or monitored assessments within the system 100 to determine if potential network threats or attacks are at hand. As will be described in more detail below, this can include automated and/or healing operations to mitigate network security threats. In another aspect of the present invention, one or more learning tools 170 can be provided (can also be host and/or networked based) that learn system activities or patterns during a training or configuration period, then perform automated actions in response to detected deviations from the learned activities or patterns. Such automated actions can include altering network activity (e.g., preventing further network attempts to automation assets or network devices) and firing an alarm such as an e-mail or pager to notify an entity (user and/or machine) of a potential or detected problem.

It is noted that the security tools 140, 150 and/or 160 can share or exchange information between tools. For example, the security analysis tool 140 can receive input from the validation tool 160 (e.g., three new network devices detected in topology), wherein the security analysis tool generates new or adjusted security output data 150 in response thereto. It is further noted that one or more of the automation assets 120 may directly access the network 130 and/or may employ the network devices 124 to achieve network access.

Figure 2:
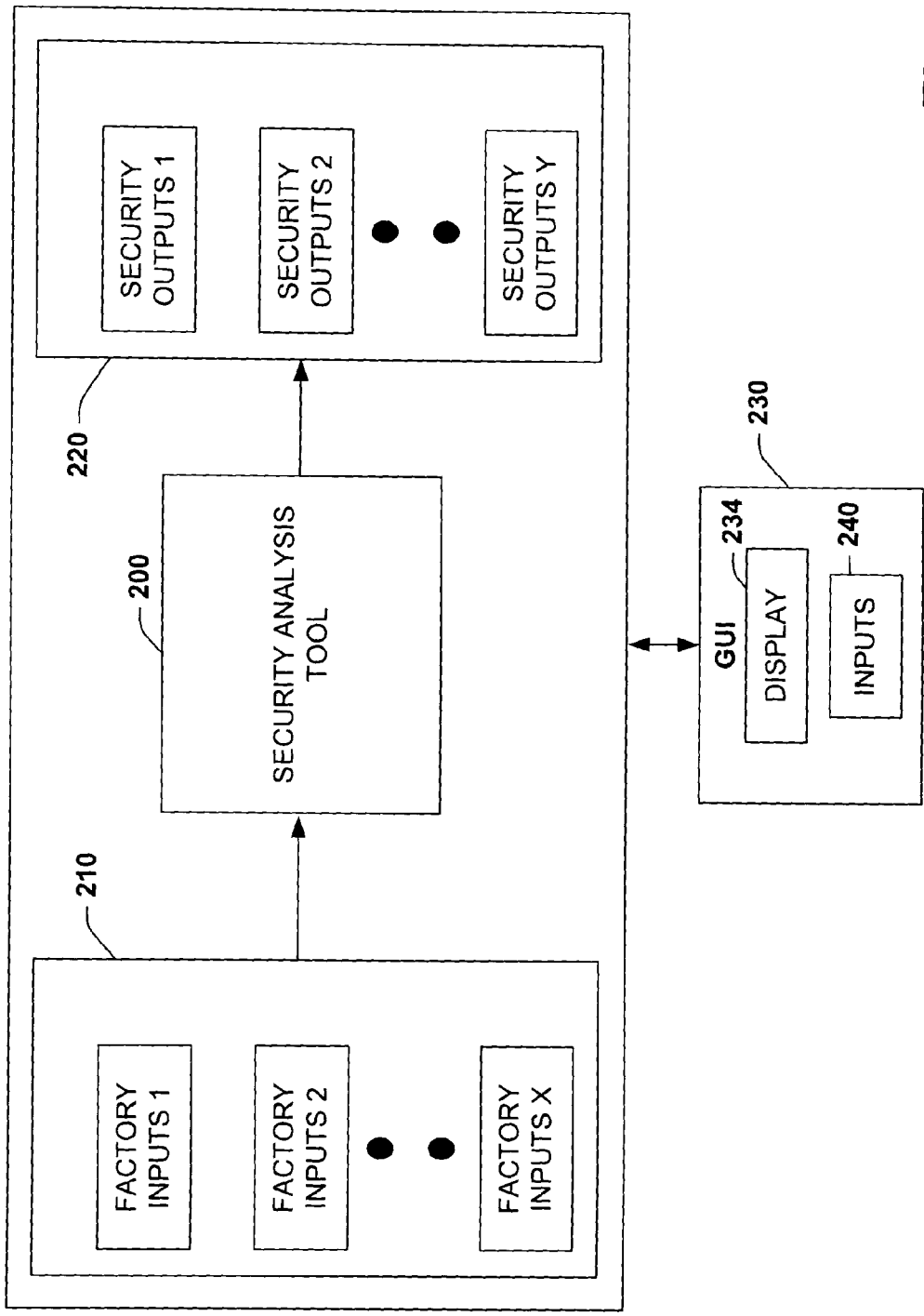
FIG. 2 is a schematic block diagram illustrating a security analysis tool in accordance with an aspect of the present invention.

Turning to FIG. 2, a security analysis tool 200 is illustrated in accordance with an aspect of the present invention. The security analysis tool 200 operates on a computer or workstation and receives one or more factory inputs 210 that can be generated from a plurality of sources. Such sources can include user input, model input (e.g., asset models, network models), schemas, formulas, equations, maps, and codes, for example. The factory inputs 210 are then processed by the security analysis tool 200 to generate one or more security outputs 220 which can also be provided in various forms such as manuals, documents, schemas, executables, codes, e-mails, and/or other electronic data that is described in more detail below. As illustrated, a Graphical User Interface 230 (GUI) or interface application can be provided to interact with the security analysis tool 200, factory inputs 210, and/or security outputs 220. This can include substantially any type of application that sends, retrieves, processes, and/or manipulates factory input data 210, receives, displays, formats, and/or communicates security output data 220, and/or facilitates operation of the security analysis tool 200. For example, such interfaces 230 can also be associated with an engine, editor tool or web browser although other type applications can be utilized. The GUI 230 includes a display 234 having one or more display objects (not shown) including such aspects as configurable icons, buttons, sliders, input boxes, selection options, menus, tabs and so forth having multiple configurable dimensions, shapes, colors, text, data and sounds to facilitate operations with the security analysis tool 200. In addition, the GUI 230 can also include a plurality of other inputs 240 or controls for adjusting and configuring one or more aspects of the present invention. This can include receiving user commands from a mouse, keyboard, speech input, web site, remote web service and/or other device such as a camera or video input to affect or modify operations of the GUI 230.

Figure 3:
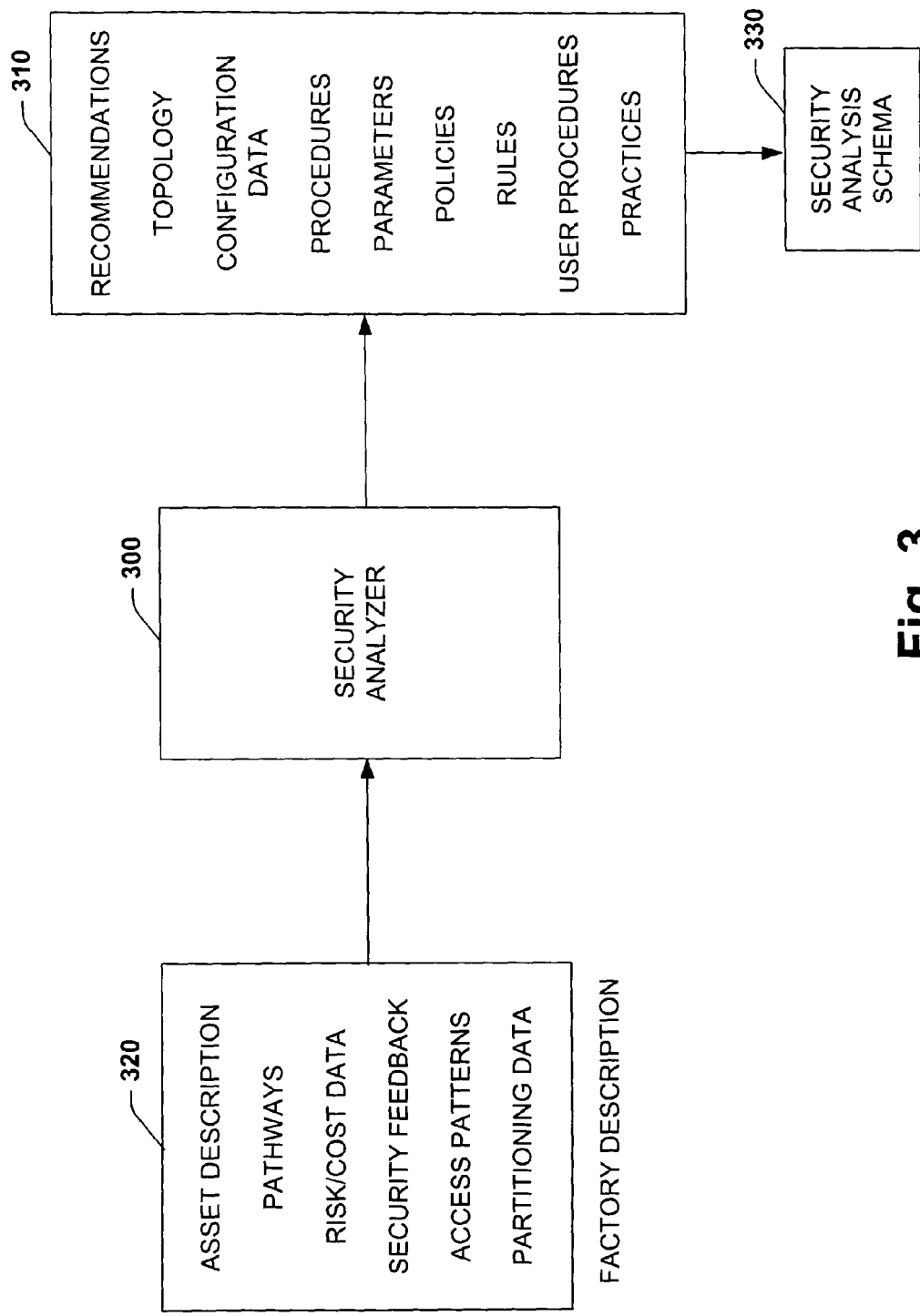
FIG. 3 is a diagram illustrating an example security analyzer in accordance with an aspect of the present invention.

Referring now to FIG. 3, an example security analyzer 300 is illustrated in accordance with an aspect of the present invention. The security analyzer 300 can be an automated process, application, component, and/or tool that generates a set of security guidelines or security data 310 and executes a Security Analysis Method (SAM) in accordance with the present invention. An input to the security analyzer 300 is an abstract description of a factory depicted as factory data 320. The factory data 320 can describe or model one or more automation assets to be protected and associated network pathways to access the assets. Other factory data 320 can include risk data, cost data, security feedback from other security tools, network access patterns, and partitioning data, for example. Security data 310 generated by the security analyzer 300 includes a set of recommended security components, related interconnection topology, connection configurations, application procedures, security policies, rules, user procedures, and/or user practices, for example, that is employed to guide users and adapt systems with various security measures.

The Security Analysis Method noted above, and security analyzer 300 can also be modeled on a risk-based/cost-based approach, if desired. A suitable level of protection can be determined to facilitate integrity, privacy, and/or availability of assets based on risk and/or cost. Thus, security parameters, policies, and procedures, for example, can be increased if lower security risks and associated costs are desired, whereas security measures can be decreased if higher risks and/or costs associated with network attacks or intrusions are deemed acceptable. In addition, descriptions of shop floor access, Intranet access, Internet access, wireless access and/or other network access patterns can also be described as factory data 320 and processed by the security analyzer 300. Since multiple party involvement can be accommodated (e.g., IT, Manufacturing, Engineering, etc.), the security analyzer 300 can be adapted for partitioned security specification entry and sign-off. The security data 310 can be generated in a structured security data format (e.g., XML, SQL) that facilitates further validation and compliance checking of the security data, if desired. As illustrated, a security analysis schema 330 which is described in more detail below, can be derived from the security data 310 and can be provided to other entities such as users or machines for further security processing/implementations.

Figure 4:
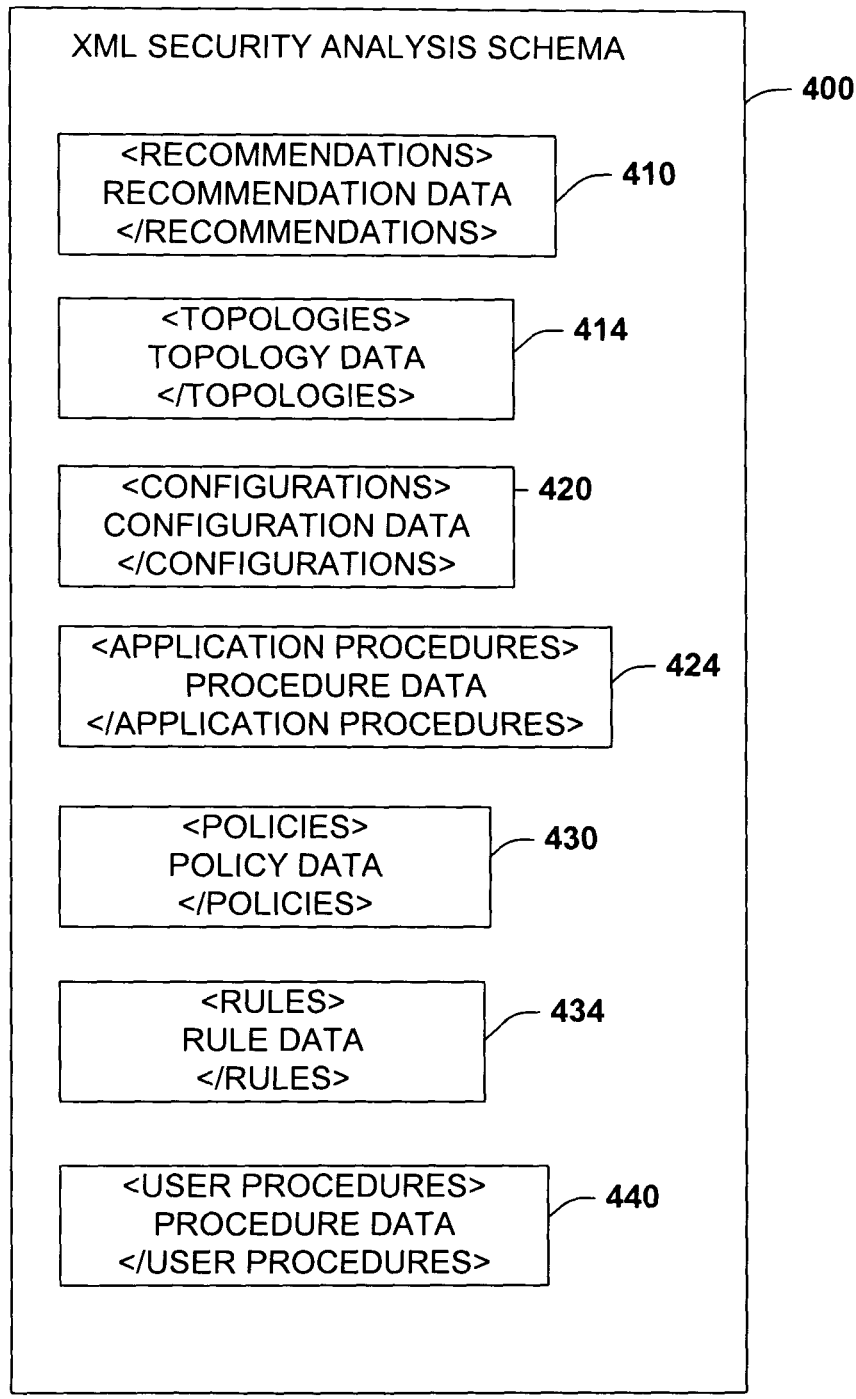
FIG. 4 is a diagram illustrating an example security analysis schema in accordance with an aspect of the present invention.

FIG. 4 illustrates an exemplary schema that may be employed for security deployments, communications, and configurations in accordance with the present invention. Although the schema represents one possible manner in which to transfer data to and from an entity such as a user, interface, file, an automation component and associated network devices, it is to be appreciated that other possible data transfer mechanisms may be employed. For example, data can be transmitted in the form of binary or other type data packets that convey information in accordance with the present invention.

Referring to FIG. 4, an example security analysis schema 400 is illustrated in accordance with an aspect of the present invention. The security analysis schema 400 includes one or more XML elements 410 through 440 (defined by starting and ending tags with (</> symbols), arranged in substantially any order) that relate to one or more security items or data and provide information to facilitate security guidelines and configurations. Although not shown, the XML elements and associated tags can also include attribute information if desired, wherein an attribute is a name-value pair associated with an element start tag (e.g., <topology="PLC connected to gateway device having firewall protection">). The security analysis schema 400 can then be deployed to various systems and/or components to control/adapt network access based upon the security contents specified therein.

Proceeding to 410, a recommendations element can be provided having associated recommendations data. This can include suggestions as to how to adapt automation components and network devices for suitable security measures (e.g., in view of risk and cost criteria). In one example, a suggestion can be in the form of a statement "All real time control devices and networks should only be connected to public networks via front-end server having virus detection, intrusion detection, and virtual private network capabilities." In another example, "Remote factory network devices must be identified, authorized, and authenticated before achieving access to control network, otherwise, local factory network devices should communicate with low-end encryption technologies." As can be appreciated, a plurality of such recommendations can be provided. At 414, a topologies element can be provided. This can include information on how to interconnect various devices and networks to achieve desired security goals (e.g., PLC connects to router, router connects to factory server and protected gateway . . . ). In another aspect, the topology data 414 can be in the form of symbols or codes that are employed to construct topology or network maps/displays via a visual or other type application.

At 420, configuration data can be provided. This type of data can include settings or parameters for adapting network components with suitable security measures (e.g., communications module word three should be set to value 03 AA Hex for extended security checking, set dip switch two on gateway to cause authentication and authorization procedures with outside network devices, install virus detection software on network server . . . ). In another aspect, the configuration data can be sent or deployed to devices via the schema 400 and loaded to cause automatic configurations. At 424, an applications procedure element can be provided having associated procedure data. Such data can include the types of security applications to load, any security adjustments or settings relating to the applications, application status information to verify, and procedures for correctly operating respective security applications to mitigate potential attacks or threats.

At 430, policy data can be provided. The policy can be general and/or specific, applied system wide and/or to a device or subset of devices. For example location-based policies can be initiated (e.g., all network requests from listed URL's are to be denied, network requests from Pittsburgh server limited to 100 per day). Time-based policies can also be defined (e.g., no outside network requests allowed between 10:00 AM and 2:00 PM). Process-based policies can be defined such as for example, "Limit outside network requests to below 50 during real time batch operations." Other policies include load-based policies, whereby network requests that are responded to are regulated in accordance with an amount of desired network traffic (e.g., regulated according to requests/hour). Other policies may be related to the type of requests (e.g., all requests to write data to the PLC are to be denied, outside devices cannot update analog module configuration data, communications module to provide status data only). In general, substantially any policy that defines, regulates, and/or limits network activities in view of security considerations can be employed with the present invention.

At 434, one or more security rules can be provided that have similar effects as the policies described above. For example, rules can be provided in an If/Then construct (can include else, else if, Boolean expressions and the like), wherein if a defined condition or conditions occur, then one or more listed actions result (can included nested constructs) (e.g., If more than 3 network access attempts are negotiated unsuccessfully, then deny further communications with node or address). At 440, user procedure data can be provided. This can include actual procedure data and/or links to databases or websites to acquire the data. Such data can instruct users on suitable security procedures, security precautions, training, configurations, examples, wizards, manuals, trouble shooting, emergency contacts, contact information, maintenance, and the like which are designed to mitigate system security problems.

Figure 5:
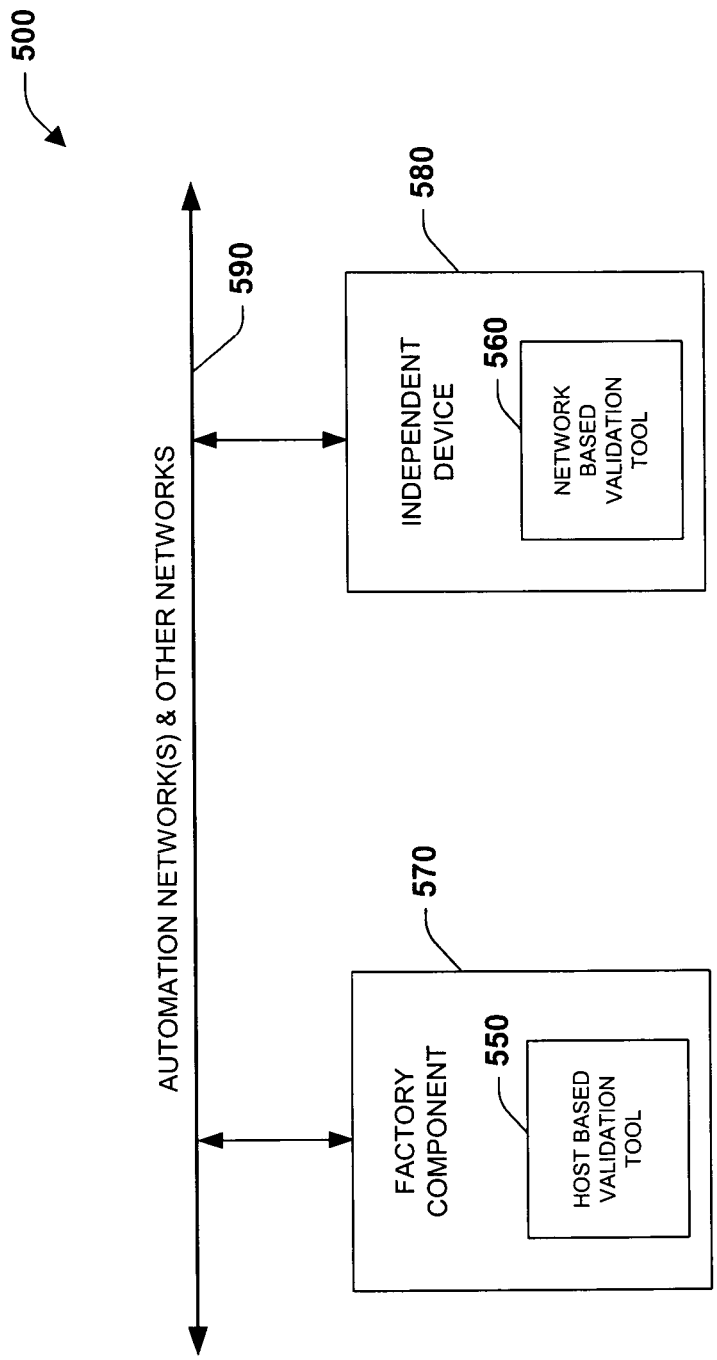
FIG. 5 is a diagram illustrating a validation system, methodology, and security validation tools in accordance with an aspect of the present invention.

FIG. 5 illustrates a validation system 500, methodology, and validation tools 550, 560 in accordance with an aspect of the present invention. The validation tools 550 and 560 perform initial and periodic live security assessment of a physical system. This enables security flaws or weaknesses to be identified. One aspect of the tools is to check the system 500 prior to proposed or attempted security modifications in order to assess current security levels. Another aspect is to check the system 500 for conformance—to the recommendations of a security analysis tool described above, and/or against standards such as ISO, for example.

The validation tools 550 and 560 can be executed on end devices 570 (host based), and/or executed as an independent device 580 that is attached to a network 590 (network based) at selected points. One function of the host-validation tool 550 is to perform vulnerability scanning and/or auditing on devices. This includes revision checks, improper configuration check, file system/registry/database permissions check, user privilege/password and/or account policy checks, for example.

One function of the network validation tool 560 is to perform vulnerability scanning and auditing on the networks 590. This includes checking for susceptibility to common network-based attacks, searching for open TCP/UDP ports, and scanning for vulnerable network services. The tools 550 and 560 can also attempt to gain key identity information about end devices that may enable hacker entry.

Another function of the network validation tool 560 is to perform vulnerability scanning and auditing on firewalls, routers, and/or other security devices. In addition, a complementary tool can be provided to assess CIP-based factory automation systems for security (includes substantially any factory protocol). This will typically be a network-based tool, since factory automation devices often are not as capable as general purpose computing devices. The network validation tool 560 can also be operable in an assessment mode to discover system flaws with little or no configuration, and the tool can operate in a validation mode to check system security against security analysis methodology determinations described above. Still yet other functions can include non-destructively mapping a topology of IT and automation devices, checking revisions and configurations, checking user attributes, and/or checking access control lists. The validation tools described herein can also be adapted to automatically correct security problems (e.g., automatically adjust security parameters, install new security components, remove suspicious components, and so forth). It is to be appreciated that one or more of the functions described herein for the host validation tool 550 may be shared/interchanged with the network validation tool 560, and visa versa.

Figure 6:
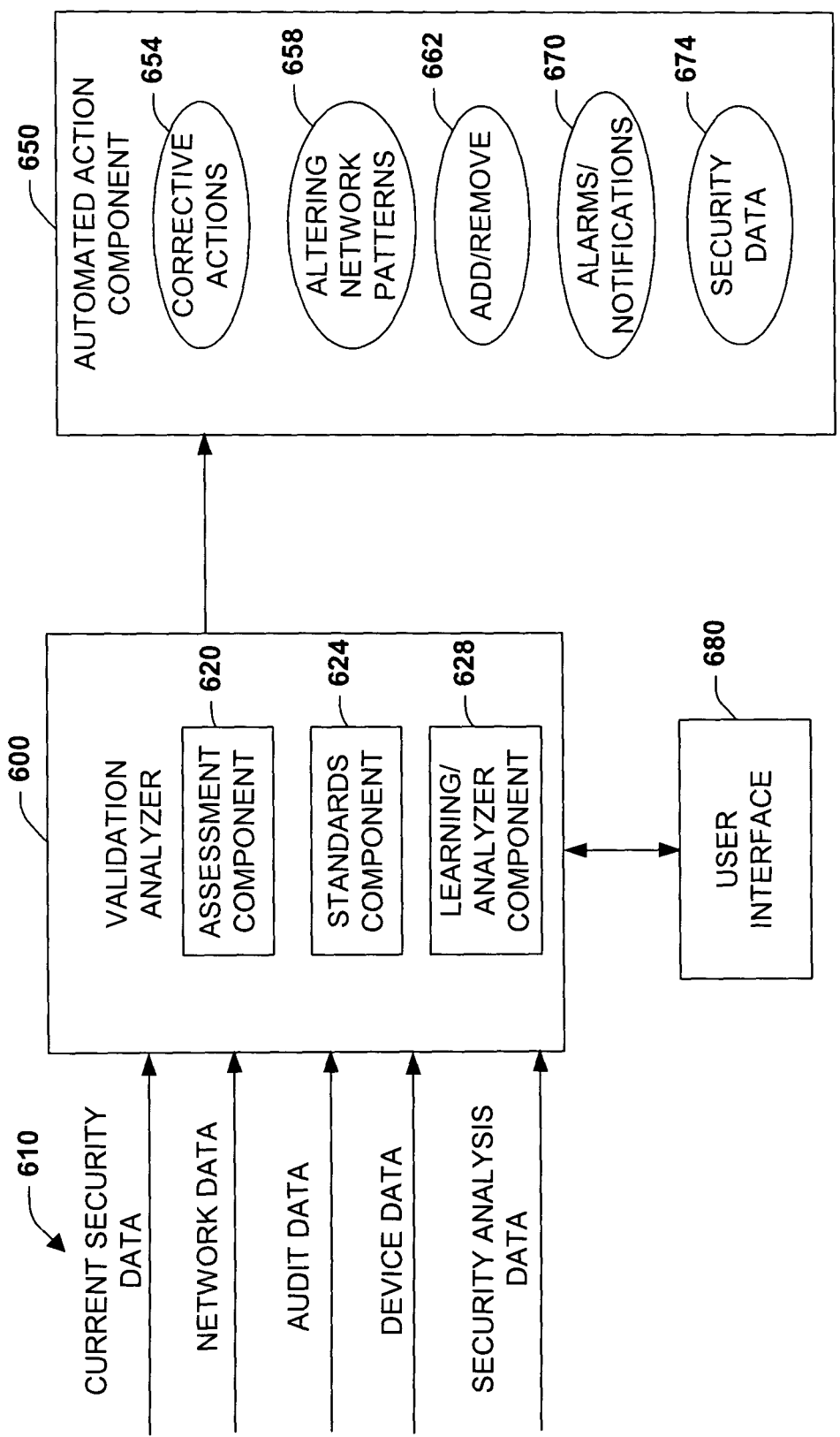
FIG. 6 is a schematic block diagram illustrating a validation analyzer in accordance with an aspect of the present invention.

Referring now to FIG. 6, a validation analyzer 600 is illustrated in accordance with an aspect of the present invention. The validation analyzer 600 can be a hardware device, computer, processor, application, and/or combination thereof that process one or more security data inputs 610 such as can be received or communicated from a network (not shown). The security data inputs 610 include current security data, network data, audit data, device data, security analysis data, and/or other data that can be derived from scanning or querying a network and associated devices via the validation analyzer 600 for information regarding current network security conditions. Various components can be provided with the validation analyzer 600 to facilitate security monitoring and processing. In one aspect, an assessment component 620 can be provided. The assessment component 620 performs initial and/or periodic security determinations on network systems to identify security deficiencies or problems therein. For example, the assessment component 620 may compare a stored security configuration with a network configuration received from the security data inputs 610, flag such conditions, and/or institute further actions if differences are detected.

In another aspect, a standards component 624 can be provided to perform security compliance checking. This can include automated checking prior to proposed or attempted network security modifications in order to assess current security levels. Compliance checking can also include determining conformance to other automated security analysis recommendations, conformance to applicable device/network security standards, and/or in accordance with predetermined or factory-specific standards, for example. Such checking can be in accordance with stored standards or procedures within the validation analyzer 600, or can include remote checking to such resources as network databases, web sites, web services (e.g., databases linked to Internet Protocol Security Standard, IEEE database). It is noted that the assessment component 620 and/or standards component 624 can initiate vulnerability scanning and/or auditing on devices/networks/systems. This can include revision checks, improper configuration checks, file system/registry/database permissions checks, user privilege/password and/or account policy checks, checking for susceptibility to network-based attacks, searching for open network ports, scanning for vulnerable network services, learning identity information about end devices/users that may enable attack entry, performing vulnerability scanning and auditing on firewalls, routers, and/or other security devices or components, non-destructively mapping a topology of network devices, checking revisions and configurations, checking user attributes, and/or checking network/device access control lists. As can be appreciated, such checking can include comparisons to local/remote databases or sites as noted above.

In yet another aspect of the present invention, a learning/analyzer component 628 can optionally be provided within the validation analyzer 600. This component can be adapted to learn network, device, and/or system patterns, scan current network data, and process the current network data in accordance with the learned patterns to possibly initiate other automated actions. The learning/analyzer component 628 will be described in more detail below with respect to FIGS. 7-9.

If a security issue or problem is detected by the assessment component 620, standards component 624, and/or learning/analyzer component 628, a flag or event can be fired that triggers an automated action component 650, wherein one or more automated security actions can be initiated. The automated security actions can include automatically correcting security problems at 654 such as automatically adjusting security parameters, altering network traffic patterns at 658 (e.g., increasing/decreasing communications with a node), installing new security components and/or removing/disabling suspicious components at 662, firing alarms, and/or automatically notifying entities about detected problems and/or concerns at 670, and/or generating security data at 674 such as generating an error or log file, generating a schema, generating data to re-configure or re-route network connections, updating a database or remote site, for example. As illustrated, the validation analyzer 600 can be configured and interacted with via a user interface 680 having similar input and output functionality as described above with respect to the user interface depicted in FIG. 2.

Figure 7:
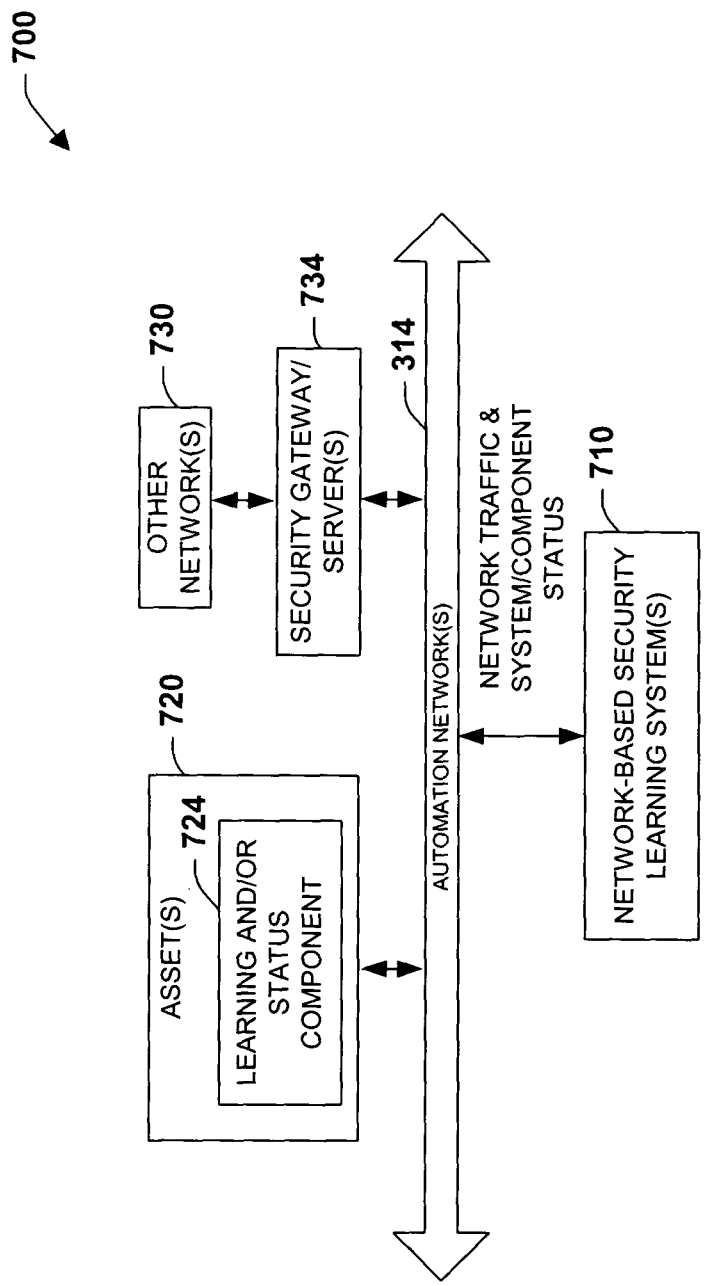
FIG. 7 is a schematic block diagram illustrating a security learning system in accordance with an aspect of the present invention.

FIG. 7 illustrates a security learning system 700 in accordance with an aspect of the present invention. The security learning system 700 that can include network-based aspects and/or host-based aspects and similar to some of the security aspects described above with respect to FIG. 5. A network-based security learning system 710 (also referred to as learning component 710) is provided that monitors an automation network 714 during a predetermined training period (e.g., monitor network activities for 1 month).

During the training period, the learning component 710 monitors and learns activities or patterns such as:

The number of network requests to and from one or more assets 720;

the type of requests (e.g., read/write, role/identity of person/system requesting access, time of requests);

status or counter data (e.g., network access counters, error codes) which can be provided or queried from a learning or status component 724 within the asset 720; and/or monitor and learn about substantially any data type or pattern that may be retrieved from the network 714 and/or the asset 720.

Network activities can also include network requests that are received from outside networks 730 that may be routed through a security gateway or server 734 before reaching the automation network 714.

After the training period, the learning component 710 monitors the automation network 714 and/or assets 720 for detected deviations from data patterns learned during the training period. If desired, a user interface (not shown) can be provided, wherein one or more pattern thresholds can be adjusted (also can provide options for the type of data patterns to monitor/learn). For example, if the number of network requests to the asset 720 has been monitored and learned to be about 1000 requests per hour during the past month, then a threshold can be set via the user interface that triggers an alarm or causes an automated event to occur if a deviation is detected outside of the threshold (e.g., automatically disable all network requests from the other networks 730 if the number of network requests to the asset 720 exceeds a set or determined percentage of the average daily network requests detected during the training period).

In one aspect, the learning component 710 and associated detection parameters or thresholds can be provided as a network-based tool or tools that can reside at various portions of the automation network 714. In another aspect, the learning component can be provided as a host-based component as illustrated at 724—depending on the resources available for the asset 720.

Various learning functions and/or processes can be provided to facilitate automated learning within the learning components 710 and 724. This can include mathematical processes, statistical processes, functions, and/or algorithms and include more elaborate systems such as a neural network, for example. In addition, artificial intelligence functions, components and/or processes can be provided. Such components can include automated classifiers for monitoring and learning data patterns, wherein such classifiers include inference models, Hidden Markov Models (HMM), Bayesian models, Support Vector Machines (SVM), vector-based models, decision trees, and the like.

Figure 8:
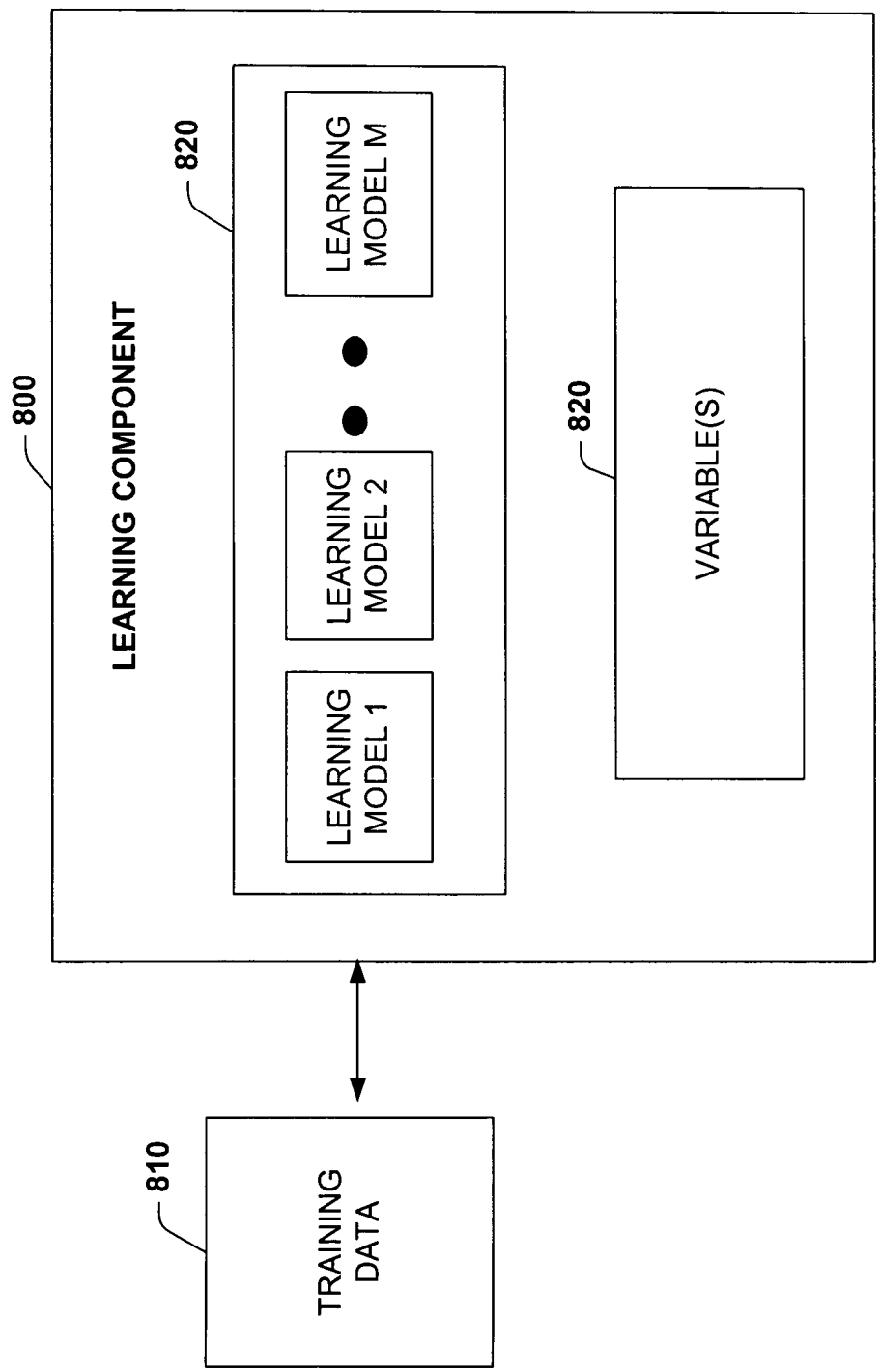
FIG. 8 is a diagram illustrating a learning component in accordance with an aspect of the present invention.

FIG. 8 illustrates a learning component 800 in accordance with an aspect of the present invention. The learning component 800 can be configured with various data types, circuits, algorithms, applications, and so forth that are adapted to learn from data or events generated from a training data set 810. The training data set 810 is derived by monitoring network or device activities over a predetermined timeframe. Such activities include network events, network data, network device activities, automations asset activities, and monitoring status information, for example. The activities can also include network access patterns, network attempts, network sources, data transfer and exchange activities, network/device load considerations, time considerations, and location considerations, for example (e.g., what time does heaviest network traffic occur, where do most network requests originate, what regions do most hacking attempts originate).

In order to process the training data 810, the learning component 800 includes one or more learning models 820 and/or learning variables 830. As noted above, the learning models 820 can include such aspects as neural network functions, inference models, mathematical models, statistical models, probabilistic models, classifiers, and so forth that learn network patterns or occurrences from the training data 810. It is also noted that the learning models can be adapted similarly (e.g., all models configured as Hidden Markov Models) or adapted in various combinations (e.g., 40 models configured as a neural network, three models adapted in a Bayesian configuration, one model configured as a vector-based classifier). The learning variables 830 can be focused on selected events or circumstances. For example, a network load variable may record the average number of outside network requests per hour. In another example, a PLC variable may record the average number of network retries that an associated PLC experiences in a given timeframe, whereas another PLC variable records the maximum number of network retries that the PLC experienced during the same timeframe. In another aspect, the learning variables 820 may be employed as counters to record amounts for various events (e.g., record the number of PLC network transfers to I/O device over the last hour). As can be appreciated, a plurality of such variables can be defined and updated to log various network events during a selected training period. After training, the learning component 810 stores learned patterns or events that are then employed by a learning analyzer component described below to monitor and detect network security problems or identify potential security issues.

Figure 9:
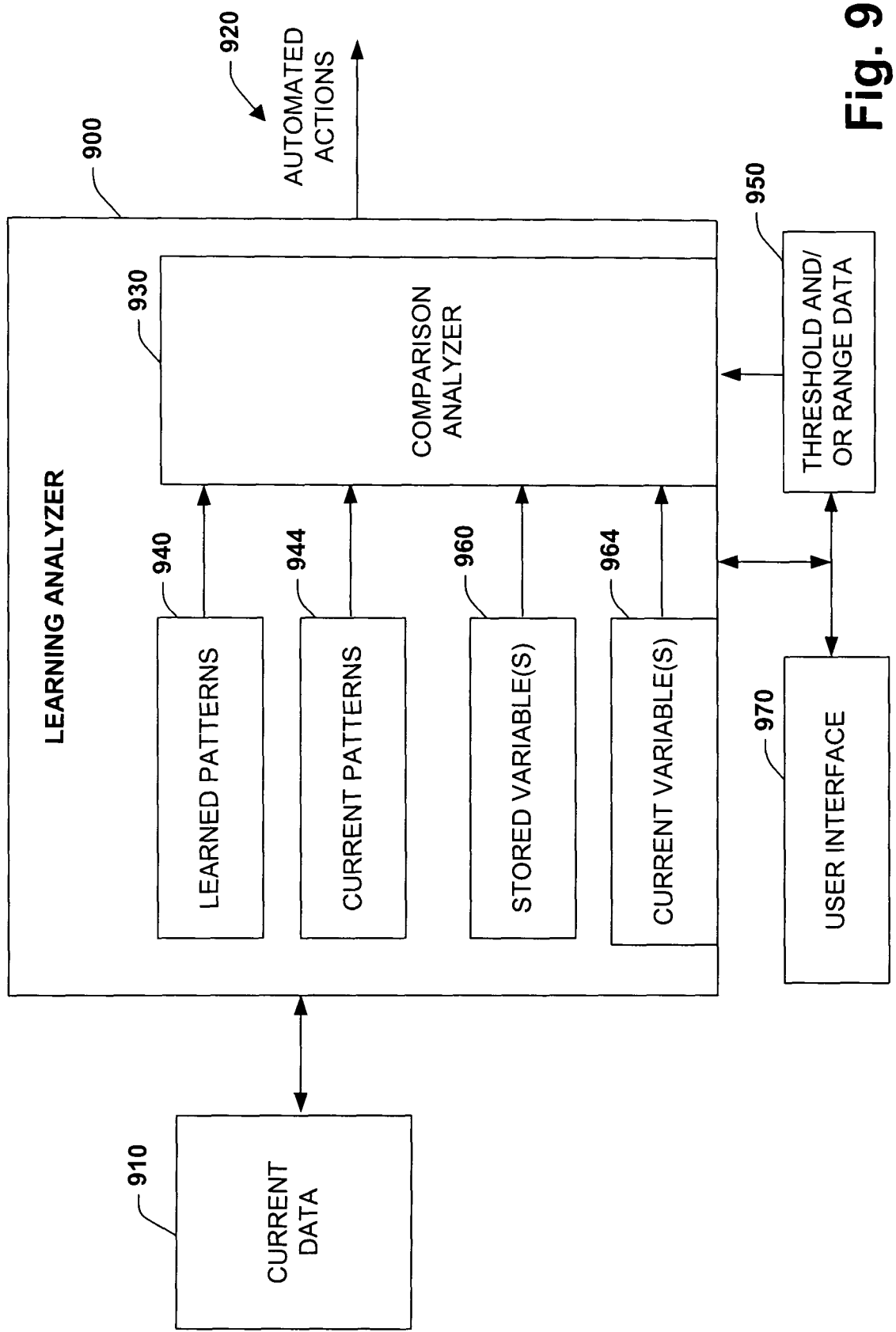
FIG. 9 is a schematic block diagram illustrating a learning analyzer in accordance with an aspect of the present invention.

FIG. 9 illustrates a learning analyzer 900 in accordance with an aspect of the present invention. The learning analyzer 900 monitors current network and/or device data 910, determines whether the current data is within tolerance of historical data patterns that were previously learned/recorded, and initiates one or more automated actions 920 if current data 910 including trends derived therefrom are determined outside of the tolerance. These determinations can be achieved via a comparison analyzer 930 that compares learned data patterns with current data patterns 944 in accordance with threshold and/or range data illustrated at 950. For example, a learned pattern 940 could be that between 11:00 and 12:00, network load between four network devices is about ten million data packet transfers. Thus, if a threshold 950 were set for one million transfers, and if current data patterns 944 exceeded more than one million transfers above the learned data patterns 940 (ten million transfers during the selected period), then the comparison analyzer 930 would detect this overload (e.g., via subtraction of current and learned data, then comparing to threshold data) and initiate the automated actions 920.

Similar to the validation components described above, the automated actions 920 can include automatically correcting security problems such as automatically adjusting security parameters, altering network traffic patterns, installing new security components, removing/disabling suspicious components, firing alarms, and/or automatically notifying entities about detected problems and/or concerns among other actions, for example.

In another aspect, the threshold data 950 can include range data thus providing upper and lower thresholds for given patterns. For example, a range can be specified to detect events that occur within or outside the selected range. In the example above, a range may have been specified as plus and minus one million transfers (do not have to be equidistant ranges), thus if current data patterns were detected to be above eleven million or below nine million transfers, then an automated action 920 would be initiated by the comparison analyzer 930 if current data patterns were outside the selected range of 10 million, +/−1 million transfers. As can be appreciated, a plurality of thresholds and/or ranges 950 can be specified. In addition, the threshold and range data 950 can be specified in various formats (e.g., in accordance with standard deviation), and can include dynamically adjustable thresholds or ranges (e.g., set threshold high in the morning and lower in the afternoon, change threshold according to real time processing requirements).

As illustrated, the comparison analyzer 930 can also monitor, analyze, and detect deviations of stored variables 960 and current variables 964 in view of the threshold and range data 950. A user interface 970, having similar display/input functionality as previously described, can be provided to specify/adjust the threshold and/or range data 950. The user interface 970 can also interact with and control the learning analyzer 900 (e.g., set threshold or ranges, add, remove, adjust learning models, view analyzer status, configure automated actions, monitor variables, adjust variables, generate security reports and the like).

Figure 10:
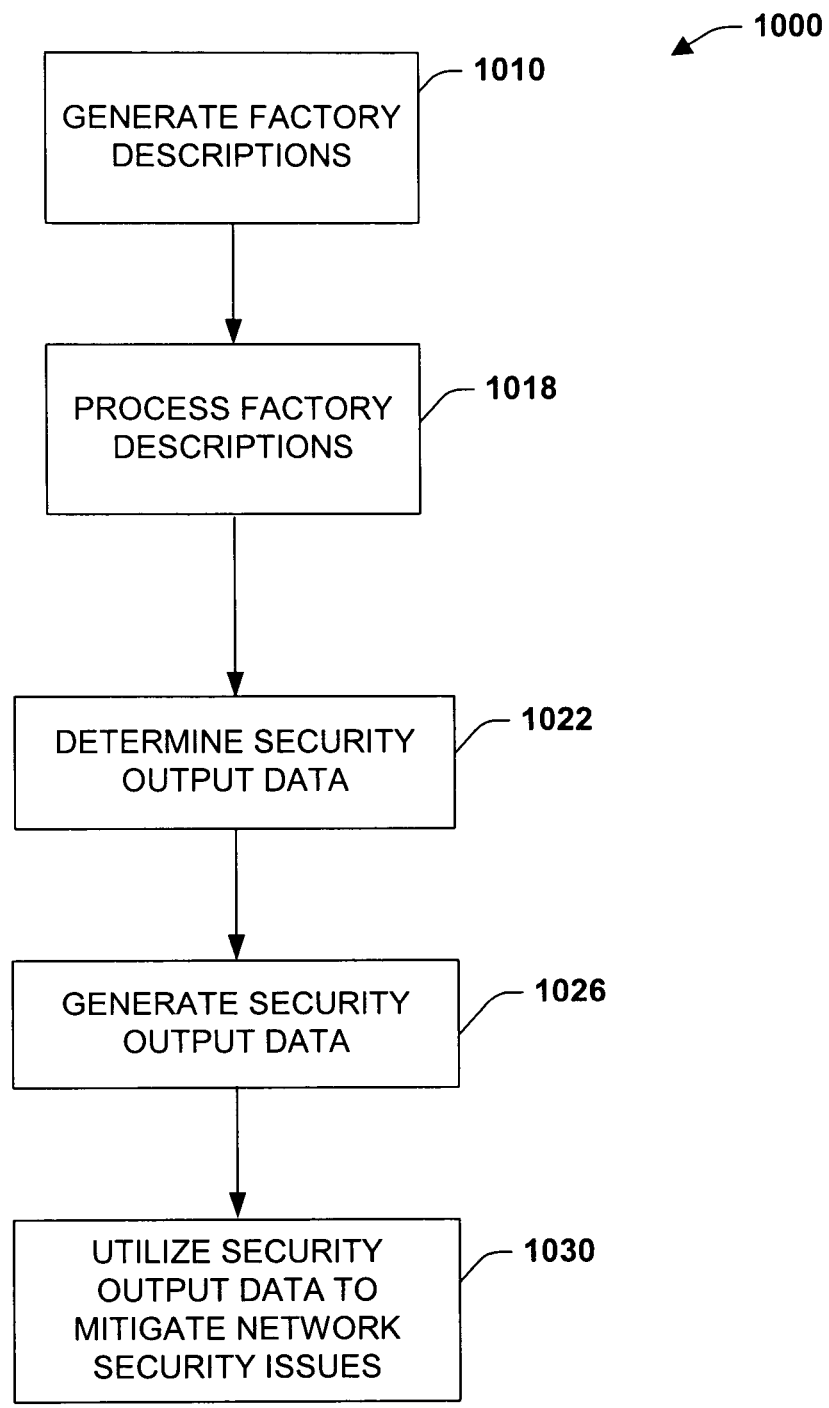
FIG. 10 is a flow diagram illustrating security analysis processing in accordance with an aspect of the present invention.
Figure 11:
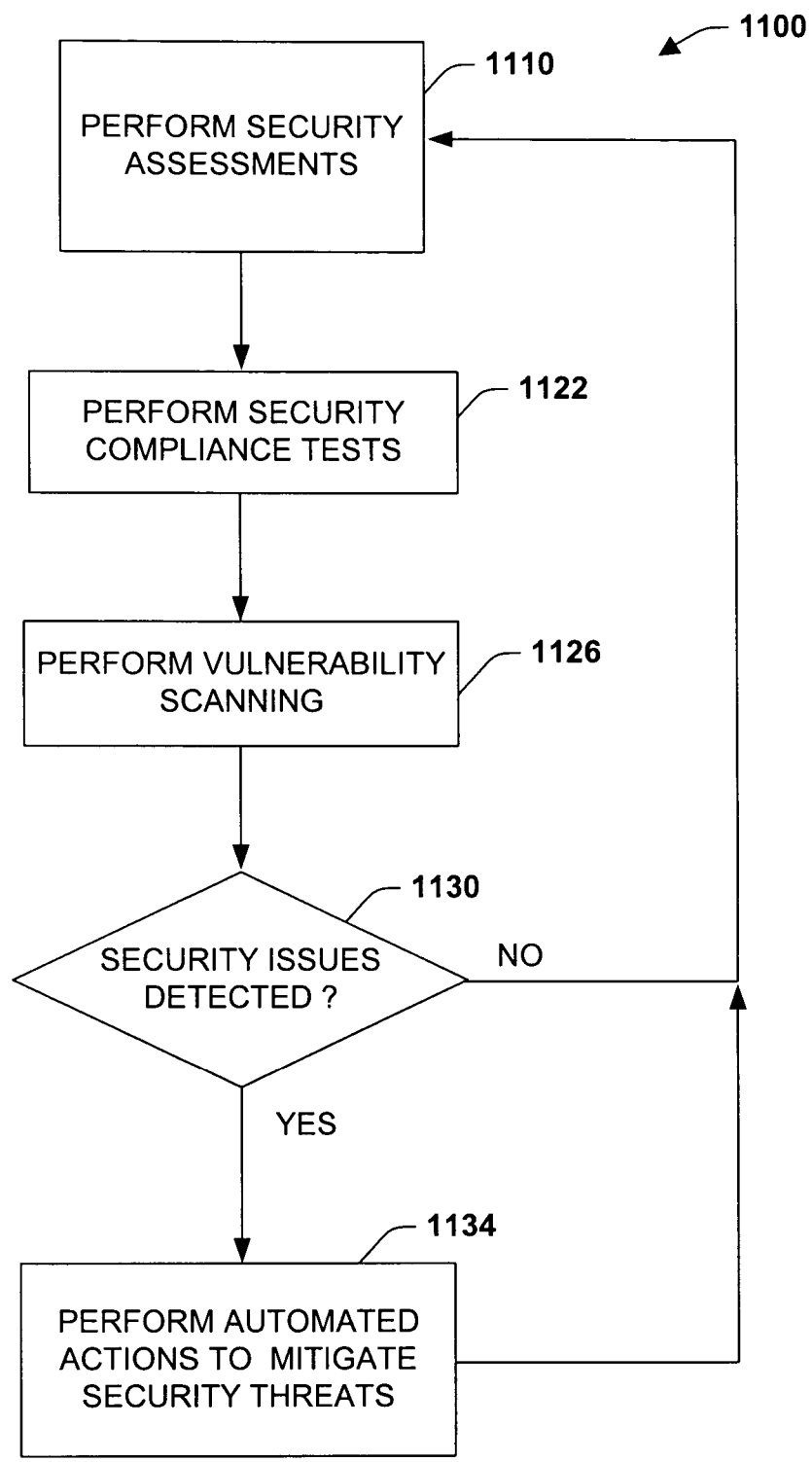
FIG. 11 is a flow diagram illustrating security validation processing in accordance with an aspect of the present invention.
Figure 12:
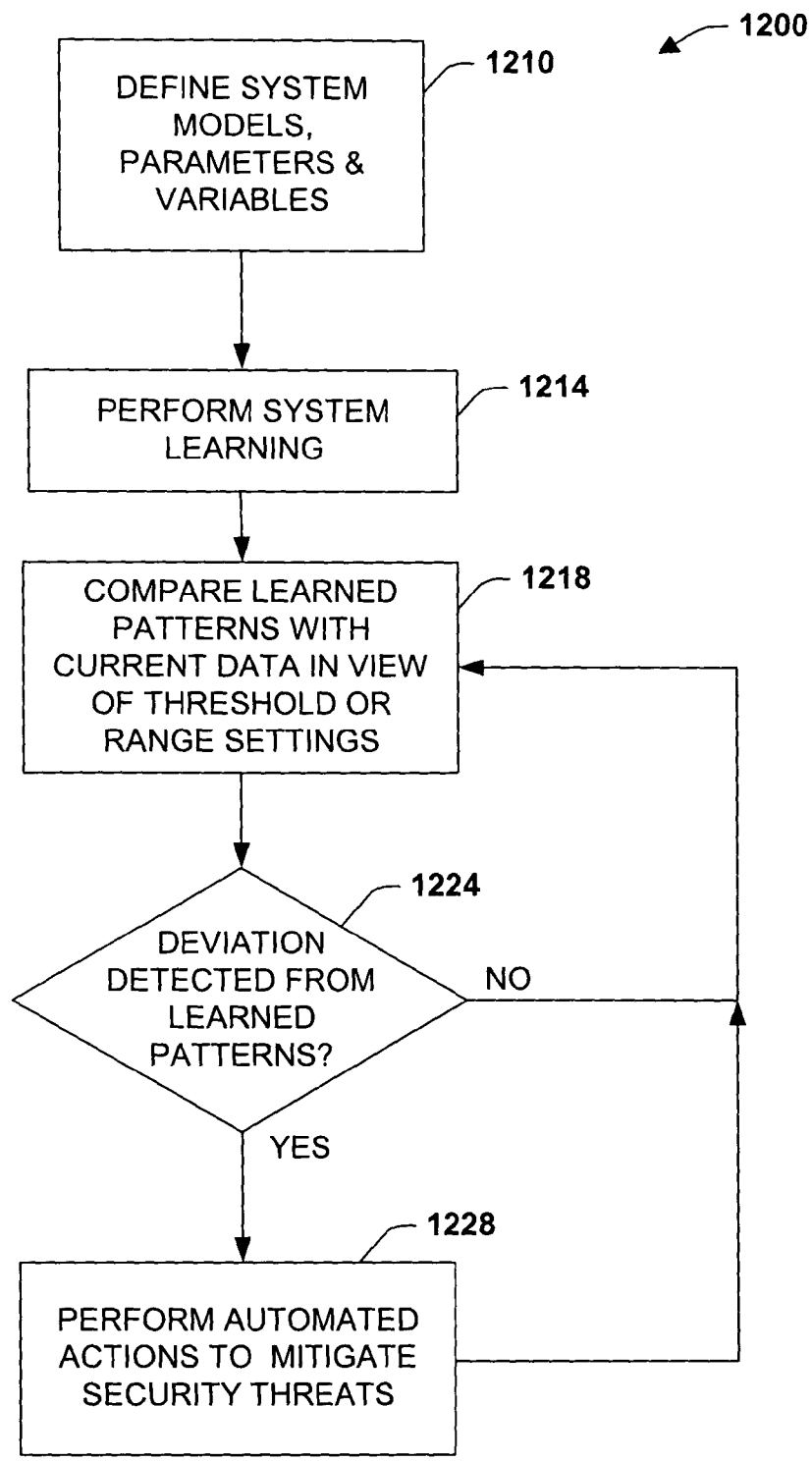
FIG. 12 is a flow diagram illustrating security learning and detection processing in accordance with an aspect of the present invention.

FIGS. 10-12 illustrate security methodologies in accordance with an aspect the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 10 illustrates a security analysis process 1000 in accordance with an aspect of the present invention. Proceeding to 1010, factory descriptions of automation assets, network devices, network topologies, and/or other factory data are generated. Such data can include an abstract description of a factory, models, equations, maps, and network pathways to access the automation assets. The descriptions can also include risk data, cost data, security data from other security tools, and partitioning or user data, for example. At 1018, the factory descriptions are processed such as via an object, application, security engine, ASIC, computer, web service, and so forth.

At 1022, security output data is determined in accordance with the factory descriptions and processing described above. The security output data can include a set or subset of recommended security components, codes, parameters, settings, related interconnection topology, connection configurations, application procedures, security policies, rules, user procedures, and/or user practices, for example, as noted above. At 1026, security output data is generated that can be automatically deployed to one or more entities such as users or devices in order to implement various security measures within an automation environment (e.g., data file or schema generated to automatically configure devices, provide user training and precautions, provide security configurations and topologies). At 1030, when the security output data has been disseminated, entities employ the security data to mitigate network security issues such as unwanted network access and/or network attack.

FIG. 11 illustrates a security validation process 1100 in accordance with an aspect of the present invention and includes host-based and/or network based processing as noted above. Proceeding to 1110, security assessments are performed. This can include initial and/or periodic live security assessment of a physical system to identify security flaws or weaknesses. At 1122, security compliance tests are performed. This can include automated checking prior to proposed or attempted network security modifications in order to assess current security levels. Compliance checking can also include determining conformance to other automated security analysis recommendations, conformance to applicable device/network security standards, and/or in accordance with predetermined or factory-specific guidelines, for example.

At 1126, vulnerability scanning and/or auditing on devices/networks is performed. This includes revision checks, improper configuration checks, file system/registry/database permissions checks, user privilege/password and/or account policy checks, checking for susceptibility to common network-based attacks, searching for open network ports, scanning for vulnerable network services, learning identity information about end devices/users that may enable hacker entry, performing vulnerability scanning and auditing on firewalls, routers, and/or other security devices, non-destructively mapping a topology of IT and automation devices, checking revisions and configurations, checking user attributes, and/or checking access control lists. At 1124, a determination is made as to whether security issues have been detected such as in accordance with the assessments, compliance testing, and scanning/auditing described above. If no security issues are detected at 1124, the process proceeds back to 1110. If security issues are detected at 1130, the process proceeds to 1134. At 1134, one or more automated security actions are performed to mitigate security threats. This can include automatically correcting security problems such as automatically adjusting security parameters, altering network traffic patterns, installing new security components, removing suspicious components, firing alarms, and/or automatically notifying entities about detected problems and/or suspicions. After automated processing at 1134, the process proceeds back to 1110 for further security processing, analysis, scanning, and detection.

FIG. 12 illustrates a security learning and detection process 1200 in accordance with an aspect of the present invention and can also include network-based aspects and/or host-based aspects as noted above. At 1210, one or more learning components such as learning models, learning systems, parameters, and/or variables are defined that describe various network and/or system properties. Such components can be adapted to determine statistical or pattern information regarding network and system activities. This information can include the number, quantity or average of network requests to and from one or more assets or network devices, the type of requests (e.g., read/write, role/identity of person/system requesting access, time of requests, location of requests), status or counter data (e.g., network access counters, error codes), and/or substantially any data type or pattern that may be retrieved from a network, automation asset, or network device. At 1214, system learning is performed. This includes monitoring an automation network during a predetermined training period, wherein the learning components described above acquire information about network, system, user, and/or device activities during the training period. For example, a counter variable may learn the average number of network requests that are sent to an automation asset in a given time period (can also be other statistical measures than average). In another example, an intelligent component such as a Bayesian inference model, probability determination, or neural network learns patterns such as "During heaviest network loads, the PLC responds to 25% fewer requests, and during real time processing operations, 35% fewer requests for a maximum of 23 requests per minute processed during such periods, +/−1 standard deviation."

After the training period at 1214, learned patterns are compared to current data patterns in view of predetermined threshold or range settings at 1218. For example, if the mean number of factory network packets transmitted is learned to be about 20,000 bytes per/second, +/−5000 bytes, and a range is set up so that if network traffic goes above 26,000 bytes per second or below 10,000 bytes per second, then system security performance is considered acceptable as long as network traffic remains in the selected range. It is noted that thresholds/ranges can be set according to user desires, automated determinations, and/or according to the amount of risk and/or costs that are deemed acceptable (e.g., for lesser amount of security risk, set thresholds closer to learned patterns).

At 1224, a determination is made as to whether or not deviations were detected from learned data patterns at 1218. If no deviations are detected, the process proceeds back to 1218 for further comparison processing. If deviations are detected at 1224, then one or more automated actions may be performed. Similar to the process described above, this can include automatically correcting security problems such as automatically adjusting security parameters, altering network traffic patterns, installing new security components, removing suspicious components, firing alarms, and/or automatically notifying entities about detected problems and/or suspicions (e.g., sending an e-mail, alerting a pager, calling a number, generating a file, sounding an alarm, interrupting a web session, opening an instant messaging service, and so forth). After automated processing at 1228, the process proceeds back to 1224 for further security processing, comparison, and detection.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A security analysis tool, comprising:
a processor; and
a memory communicatively coupled to the processor and having stored thereon computer-executable components configured to implement the security analysis tool, the computer-executable components comprising:
a learning component that monitors communication of data associated with an I/O table of an industrial controller of an automation system during a training period and generates a learned pattern of communication, wherein the I/O table stores input data received by the industrial controller from a controlled device via an I/O device and output data provided by the industrial controller to the controlled device via the I/O device; and
an analyzer component that monitors data traffic subsequent to the training period and generates one or more security outputs in response to a determination that a current pattern of the data traffic deviates from the learned pattern in excess of an acceptable deviation, the one or more security outputs comprising at least one output that alters the data traffic between the industrial controller and the I/O device.

2. The security analysis tool of claim 1, wherein the computer-executable components further comprising an interface component that generates a description of one or more industrial controllers in the automation system.

3. The security analysis tool of claim 2, wherein at least one of the interface component or the analyzer component operate on a computer and receive one or more factory inputs that provide the description, and wherein the one or more factory inputs comprise at least one of user input, a model input, a schema, a formula, an equation, a file, a map, or a code.

4. The security analysis tool of claim 3, wherein the one or more factory inputs are processed by the analyzer component to generate the one or more security outputs, the security outputs comprising at least one of a manual, a document, a schema, an executable, a code, a file, an e-mail, a recommendation, a topology, a configuration, an application procedure, a parameter, a policy, a rule, a user procedure, or a user practice employed to facilitate a security measure in the automation system.

5. The security analysis tool of claim 2, wherein the interface component is configured to render a display output having associated display objects and receive at least one input to facilitate operations with the analyzer component, and wherein the interface component is associated with at least one of an engine, an application, an editor tool, a web browser, or a web service.

6. The security analysis tool of claim 5, wherein the display objects comprise at least one of a configurable icon, a button, a slider, an input box, a selection option, a menu, or a tab, and the display objects are associated with multiple configurable dimensions, shapes, colors, text, data, and sounds.

7. The security analysis tool of claim 5, wherein the at least one input comprises a user command from at least one of a mouse, a keyboard, speech input, a web site, a remote web service, a camera, or video input analyzer component.

8. The security analysis tool of claim 2, wherein the description comprises a model of one or more industrial automation assets to be protected and one or more associated network pathways to access the one or more industrial automation assets.

9. The security analysis tool of claim 2, wherein the description comprises at least one of risk data or cost data that is employed by the analyzer component to determine a security measure.

10. The security analysis tool of claim 1, further comprising a validation component that periodically monitors the industrial controller following deployment of the one or more security outputs to determine one or more vulnerabilities related to the industrial controller.

11. The security analysis tool of claim 10, wherein the validation component automatically installs one or more security components in response to the one or more vulnerabilities.

12. The security analysis tool of claim 1, wherein the analyzer component is adapted for partitioned security specification entry and sign-off from one or more groups.

13. The security analysis tool of claim 1, wherein the analyzer component further performs an automated action that disables network requests from at least one outside network in response to detecting that the current pattern of the data traffic deviates from the learned pattern in excess of the acceptable deviation.

14. The security analysis tool of claim 1, wherein the one or more security outputs alter the data traffic between the industrial controller and the I/O device to restore the learned pattern.

15. A method for analyzing security in an industrial automation system, comprising:
monitoring, by a system comprising at least one processor, communication of data associated with an I/O table of an industrial controller for a predetermined training period to learn at least one learned pattern of communication, wherein the I/O table stores input data received by the controller from a controlled device via an I/O device and output data sent by the controller to the controlled device via the I/O device;
defining, by the system, a pattern threshold specifying an acceptable deviation from the at least one learned pattern;
monitoring, by the system, data traffic subsequent to the training period; and
performing, by the system, at least one automated security event in response to a determination that a current pattern of the data traffic deviates from the at least one learned pattern in excess of the acceptable deviation after the training period,
wherein the performing the at least one automated security event comprises at least altering a network traffic pattern between the industrial controller and the I/O device.

16. The method of claim 15, further comprising:
receiving at least one model related to the industrial controllers;
generating one or more security outputs based on the at least one model; and
automatically installing one or more security components based at least in part on the one or more security outputs.

17. The method of claim 16, wherein the generating the one or more security outputs comprises generating at least one of a recommendation of a security component, a code, a parameter, a setting, a related interconnection topology, a connection configuration, an application procedure, a security, policy, a rule, a user procedure, or a user practice.

18. The method of claim 16, further comprising:
automatically deploying the one or more security outputs to the industrial controller, wherein the one or more security outputs are configured to mitigate at least one of unauthorized network access or a network attack.

19. The method of claim 15, wherein the at least one automated security event includes at least disabling network attempts to access the industrial controller.

20. The method of claim 15, wherein the monitoring the communication of the data comprises at least one of monitoring a number of network requests to or from the industrial controller over a time frame or monitoring a type of request to or from the industrial controller during the training period.

21. A non-transitory computer-readable storage medium having stored thereon computer-executable components that, in response to execution, cause a system comprising at least one processor to perform operations, comprising:
monitoring communication of data associated with an I/O table of an industrial controller for a predetermined training period, wherein the I/O table stores input data received by the industrial controller from a controlled device via an I/O device and output data sent by the industrial controller to the controlled device via the I/O device;
learning a learned pattern of communication based on the monitoring;
defining a pattern threshold that specifies an acceptable deviation from the learned pattern;
automatically detecting that a current pattern of communication of the data associated with the I/O table deviates from the learned pattern in excess of the acceptable deviation after the training period; and
performing an automated action that alters the current pattern of communication in response to the detecting.

22. A security validation system for use in an industrial automation environment, comprising:
a processor; and
a memory communicatively coupled to the processor and having stored thereon computer-executable components configured to implement the security validation system, the computer-executable components comprising:
a learning component that monitors communication of data associated with an I/O table with respect to an industrial controller during a training period and establishes a learned pattern of communication, wherein the I/O table comprises a portion of a memory of the industrial controller that maintains input data received by the industrial controller from a controlled device via an I/O device and output data provided by the industrial controller to the controlled device via the I/O device; and
an analyzer component that monitors a current pattern of communication of the data associated with the I/O table subsequent to the training period and automatically performs a security action to bring the current pattern in line with the learned pattern in response to detecting that the current pattern communication has deviated from the learned pattern of communication in excess of a defined pattern threshold.

23. The security validation system of claim 22, wherein the computer-executable components further comprise:

a scanner component that automatically interrogates at least one of the industrial controller, the I/O device, or the controlled device at periodic intervals for security-related data;

a validation component that automatically assesses a security capability of the at least one of the industrial controller, the I/O device, or the controlled device based upon a comparison of the security-related data and one or more predetermined security guidelines; and a security analysis tool that recommends at least one network interconnection to achieve a specified security goal indicated by the predetermined security guidelines.

24. The security validation system of claim 23, wherein the security guidelines are automatically determined.

25. The security validation system of claim 23, wherein the scanner component and the validation component are at least one of a host-based component or a network-based component.

26. The security validation system of claim 25, wherein the host-based component performs vulnerability scanning and auditing on one or more devices, and the network-based component performs vulnerability scanning and auditing on one or more networks.

27. The security validation system of claim 26, wherein at least one of the host-based component or the network-based component at least one of non-destructively maps a topology of information technology and industrial automation devices, verifies a revision or a configuration, verifies a user attribute, or verifies an access control list.

28. The security validation system of claim 26, wherein at least one of the host-based component or the network-based component at least one of determines susceptibility to a network-based attack, searches for an open Transmission Control Protocol/User Datagram Protocol (TCP/UDP) port, scans for a vulnerable network service, gains identity information about an end device determined to be attempting unauthorized entry, or performs vulnerability scanning and auditing on at least one of a firewall, a router, a security device, or a factory protocol.

29. The security validation system of claim 22, wherein the security action comprises at least one of automatically correcting a security event, automatically adjusting a security parameter, altering a network traffic pattern, adding a security component, removing a security component, triggering an alarm, automatically sending a notification to an entity regarding a detected problem, generating an error file or a log file, generating a schema, generating re-configuration data to re-configure or re-route a network connection, updating a database, or updating a remote site.

30. A method for validating security in an industrial automation environment, comprising:

monitoring communication of data associated with an I/O table with respect to an industrial controller during a training period and establishing a learned pattern of communication, wherein the I/O table stores input data received by the industrial controller from a controlled device via an I/O device and output data sent by the industrial controller to the controlled device via the I/O device;

defining a pattern threshold specifying an allowable deviation from the learned pattern;

monitoring a current pattern of communication of the data associated with the I/O table subsequent to the training period; and initiating a security procedure that performs a security action to bring the current pattern in line with the learned pattern in response to determining that the monitoring identifies that the current pattern deviates from the learned pattern in excess of the allowable deviation.

* * * * *